United States Patent [19]

Glass

[11] 4,189,004
[45] Feb. 19, 1980

[54] COMPOSITION HORSESHOE

[75] Inventor: Neel W. Glass, Cuyamungue, N. Mex.

[73] Assignee: Les-Kare Inc., Cuyamungue, N. Mex.

[21] Appl. No.: 861,276

[22] Filed: Jan. 20, 1978

[51] Int. Cl.² ............................ A01L 3/00; A01L 5/00
[52] U.S. Cl. ............................................ 168/4; 168/18; 168/DIG. 1
[58] Field of Search ................. 168/18, 4, DIG. 1, 1, 168/2, 3, 19

[56] References Cited

U.S. PATENT DOCUMENTS

| | | | |
|---|---|---|---|
| 1,212,266 | 1/1917 | Schrader et al. | 168/DIG. 1 |
| 2,041,538 | 5/1936 | Gash et al. | 168/4 |
| 3,486,561 | 12/1969 | Kulak | 168/DIG. 1 |
| 3,494,422 | 2/1970 | Clark | 168/DIG. 1 |

Primary Examiner—Hugh R. Chamblee
Attorney, Agent, or Firm—Henry Heyman

[57] ABSTRACT

A horseshoe of molded composition having a sole and walls which substantially conform to the shape of a horse's hoof, the shoe is generally slipper-shaped with the front wall being high enough to cover a substantial area of the front wall of the hoof, and the rear wall is limited in height to avoid interference with the cartilage heel of the hoof, the top edge of the side walls slope downward from the upper edge of the front wall to upper edge of the rear wall, at least one reinforcing protuberance on each side wall for admitting self-threading screws for anchoring the horse boot to the side wall of the horse's hoof.

1 Claim, 3 Drawing Figures

COMPOSITION HORSESHOE

This invention relates to protective devices for horses' feet. For several hundred years the most widely used device was the metal shoe because no suitable alternative was available. The nailed-on iron shoe appears to have been first used during the time of the Roman Empire. An iron shoe nearly identical to those used today, including the nail holes, was found in the tomb of a Frankish king who died in 481 A.D.

The nailed-on metal horse shoe is still the most widely used protective device because the shape of the horse's foot and the severe loads have made it difficult to find a suitable alternative.

Measurements with high speed photography and sophisticated electronic timing and measuring devices have added a great deal to the understanding of the operation of the horses' feet in action. It is known that a horse's foot at a moderately fast gait travels through the air at peak speeds of sixty miles an hour and impacts on the ground with a force of several thousand pounds. When the hoof lands and goes under load the various parts of the hoof, some simultaneously and some successively, temporarily change shape to effect, among other things, shock absorption. A comprehensive study of the structure and behavior of horses' feet is presented on pages 18-21 and 50 of the August 1977 issue of the magazine SADDLE ACTION, published by Saddie Action, Inc. of Paso Robles, Calif., written by K. D. Butler, Jr., Ph.D. There is much other literature on the subject of the horse's hoof extending over several thousand years. For example, the Greek General Xenophon wrote in his calvary manual, "Beware of the horse with the frog off the ground".

A study of the writings of many experts in the field as well as practical experience in using the horse for endurance riding leads to certain reliable conclusions. One is that, for lack of something better, the nailed-on iron shoe was a must to give hoof protection, improve traction and as a means for the treatment and correction of some hoof injuries and conformation defects. But there are definite disadvantages and harmful effects of metal shoeing. It has been estimated that 80 percent of lameness in horses today is caused or aggravated by shoeing. Some of the harmful effects of nailed-on iron shoes are: nails weaken the hoof walls; iron shoes increase concussion and they hold the frog off the ground, thus reducing blood circulation through the leg and hoof. Nailed shoeing can cause contracted heels, contribute to navicular disease, sidebones, ringbones and other ailments. Many of these problems arise simply because nailing on an iron shoe locks in problems that a barefoot hoof would naturally adjust by normal wear and freedom from restraint.

Concussion causes many hoof and leg problems including road founder, ossilets, bucked shins and navicular disease. Running a barefoot horse on pavement or hard-packed ground for any considerable distance is apt to cause damage, but running an iron shod horse under these conditions is much worse. With the barefoot hoof, the frog and bars help distribute and moderate the shock, but the frog of an iron shod hoof is prevented from exercizing its natural function with the result that the hoof wall takes all the impact and all the load. Considering that the coffin bone (third phalanx) is attached to the hoof wall and rests on the digital cushion which in turn is supported on its bottom by the frog in the rearward portion of the hoof and by the sole at the forward part, if there is no support from the frog and sole, road founder develops by the coffin bone tearing away from the hoof wall and eventually dropping through the sole.

To the end that the horses' hooves and legs will be protected from excessive wear and tear and from the deleterious consequences of the nailed-on metal shoe, the alternative should be a protective shoe or boot which attains protection while duplicating to the greatest extent possible the natural conditions of the unshod hoof. This means a shoe or boot which supports the hoof wall, has a sole for cooperation with the hoof frog and allows the hoof parts to flex without restraint under impact and load.

Many attempts have been made in the prior art to provide a protective device for the horse's foot incorporating the aforementioned objectives. For example, the horseboots described by the present inventor in U.S. Pat. Nos. 3,703,209 and 3,732,929 have been successful in achieving those ends. However, although the horseboots disclosed in the referenced patents have had widespread acceptance and success, it has been found to be desirable to provide horseshoes which retain many of the desirable characteristics of the patented devices, but will be more economical to produce.

The horseboot of the above referenced patents are retained on the horse's hoof by a pair of bifolds in the front wall and a manually operated constricting mechanism. Thus the referenced horseboots are not affixed to the hoof by penetrating devices such as nails and are readily put on and taken off by a person who does not have the specialized knowledge of the farrier.

The horse shoe of the present invention is simplified by the use of penetrating devices utilized to fasten the shoe to the hoof in a novel manner. The simplified structure is accomplished through recognition that the thickness of the hoof wall is essentially uniform throughout its length and allows for the use of self-threading screws inserted at right angles to the hoof wall. Thus if the horse shoe of this invention is, in effect, in the form of a slipper, screws can be inserted through the lateral walls into the hoof wall to secure the shoe in place. The shoe can be readily put on and taken off by a non-professional because the operation is in no wise sophisticated like the installation of nails from the bottom of the hoof wall.

Accordingly it is a prime objective of the present invention to provide a simple and economical horse shoe which protects the horse's hooves in a natural manner and which can be simply attached and removed by the horse owner.

Other objectives and advantages will become apparent from reading the following specification with reference to the drawings in which.

Figure 1:
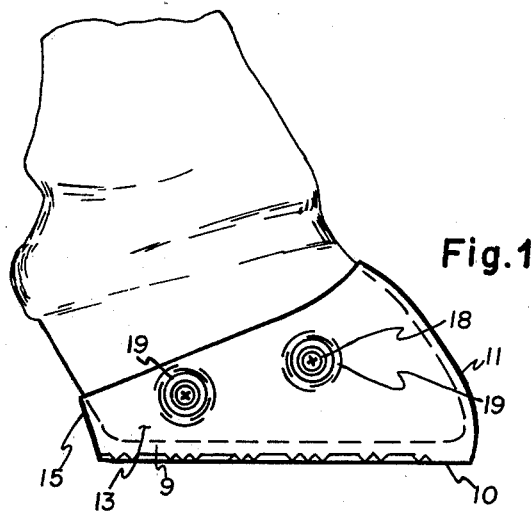
FIG. 1 is an elevation of the horse boot of the present invention mounted on and secured by screws to a horse's hoof.
Figure 2:
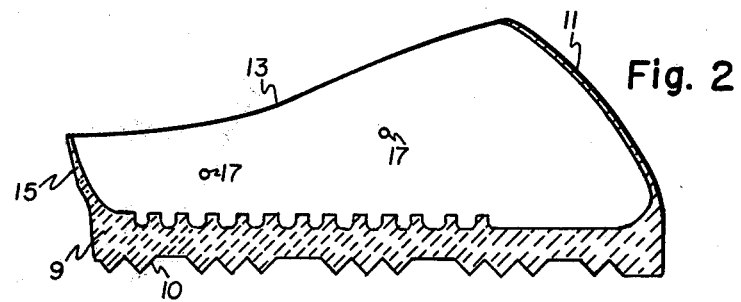
FIG. 2 is a sectional elevation of the horse boot of the present invention.
Figure 3:
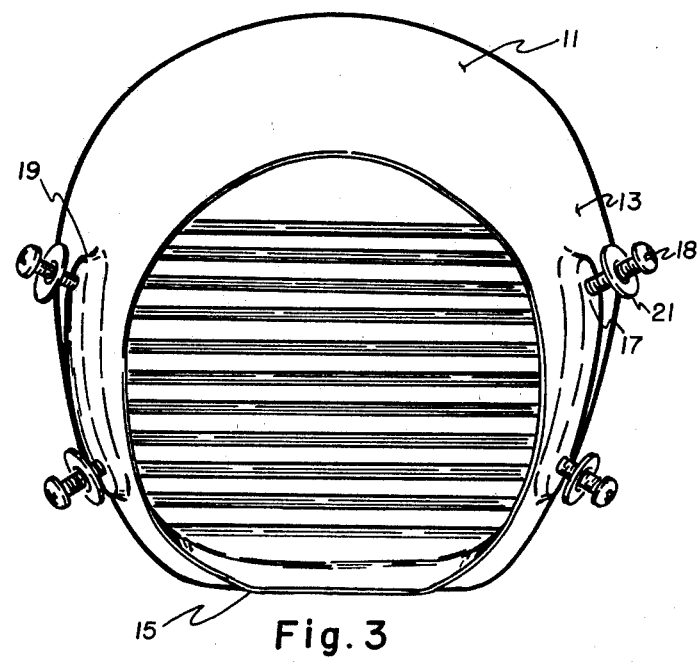
FIG. 3 is in downwardly inclined rearwardly view showing the various features of the horse boot.

Referring to the figures of the drawing, the horse shoe of the present invention comprises a sole portion 9 provided with treads 10, an integral front wall 11, integral side walls 13 and a short integral rear wall 15. The horse shoe is molded of a strong composition such as polyurethane. This material while flexible, has great tensile strength, an excellent memory and resists elongation and/or tearing. The shape is designed to permit the shoe to be slipped up and rearward onto a horse's hoof. The shoe is secured in place by self-threading screws 18 which pass through the shoe sidewall and are embedded in the hoof sidewall. The location of screw holes 17 and the protuberances 19 is in the upper portion of the shoe sidewall, preferably in the zone between a fore and aft median line and the upper edge of the sidewall as shown in FIG. 1.

The simplified features of the present horse boot are predicated on the fact that the hoof sidewalls have substantially uniform thickness from coronary band to sole. In the usual riding horse of between 1000 and 1100 pounds weight, the thickness of the hoof in the "quarters" closely approximates three-eighths of an inch. The sidewall of the shoe, shown in FIG. 1, in the proximity of the screw holes 17 is provided with an integral protuberance 19 to the end that the combined thickness of sidewall with protuberance will cooperate with self-threading screws 18 to permit penetration into the hoof wall an adequate distance, but not to penetrate through the hoof wall. The protuberance need not be circular as shown in FIG. 1, but may have any shape such as a protruding rib as shown in FIG. 1.

In one specific practicable embodiment, the thickness of boot sidewall with protuberance is $\frac{1}{4}$ inch. The length of the threaded portion of the self-threading is $\frac{1}{2}$ inch. Thus the depth of penetration of the screws into the hoof side wall is just about $\frac{1}{4}$ inch with the protuberance is compressed slightly. Accordingly, while the objective of securely affixing the shoe to the hoof is accomplished, there remains approximately $\frac{1}{8}$ inch of the hoof wall which remains unpenetrated and sealed.

The specific example of screw size above given is applicable to the usual riding horse. When applied to a heavy dray horse such as a Clydesdale, or Percheron, much larger and heavier boots and screws may be used.

The material forming the slipper horse shoe must not be appreciably elastic. Polyurethane formulated to be stiffly flexible is ideal because the high sloping wall at the front of the shoe takes much of the retention load while the self-threading screws at the quarters anchor the slipper in place against loosening due to forward slipping. The wall at the rear of the slipper extends upward a short distance so as not to irritate the bulbs of the horse's foot. The side walls slope downward on the quarters from the front wall to the rear wall. It has been determined that a wall thickness of $\frac{1}{8}$ inch provides adequate strength. The sole is from $\frac{3}{8}$ to $\frac{1}{2}$ inch in thickness including traction ribs. This thickness of sole protects the sole of the horse's foot from stone bruises and provides about three times the durability of iron shoes.

The slipper shoe is slipped home on the horse's hoof and while held snugly in place is fastened in place by driving the self-threading screws to a squeeze condition against the slipper side wall protuberances.

Although not essential, it has been found helpful in keeping debris such as sand, dirt and manure out of the slipper shoe to put a fast-setting polyurethane foam in the slipper just before the slipper is installed on a horse's foot. In approximately an hour at 70 degrees F. the foam sets to provide good mechanical coupling between the slipper sole and the sole of the horse's foot. It is desirable to use a foam formulated to have mechanical properties similar to those of the frog to obtain optimum mechanical coupling. The foam also adheres to the shoe and a clean hoof.

The chemical constituents for formulating a polyurethane foam are available commercially. One formula which provides the correct degree of flexibility and elasticity is made up into two components which are then mixed in a container before pouring into shoe. These components termed Parts A and B for ease in explanation are constituted as follows:

Part A 4 parts Conap TU-90, Comp A manufactured by Conap, Inc.

2 parts FSC 1400-12, Comp A manufactured by Foam Systems Co.

Part B 3 parts Conap TU-90, Comp B manufactured by Conap, Inc.

2 parts FSC 1400-12, Comp B manufactured by Foam Systems Co.

0.007 part Dabco 33LV manufactured by Air Products and Chemicals, Inc.

0.007 parts water.

The Conap TU-90 is a two component polyurethane elastomer casting system.

The FSC-1400-12 is a 12 pound per cubic foot rigid urethane pour foam.

Dabco 33LV is triethylene diamine in dipropyline glycol.

The mix for the slipper liner is 3 parts of Part A and one part of Part B. These are mixed thoroughly and poured into the slipper. The slipper shoe is installed immediately. The hoof and shoe should be prepared in advance by slipping the shoe onto the hoof and at least partially driving the screws into the hoof to provide the screw sockets. The screws are withdrawn and the shoe removed for the foam-pour and final installation. If it is desired to prevent foam adherance to the hoof, the hoof is coated with a hoof dressing.

What is claimed is:

1.
(1) A polyurethane working horseshoe in slipper form comprising: a sole, front, side and rear walls;
(2) said front wall inclined rearwardly to conform with the inclination of a hoof front wall;
(3) said side walls inclined upwardly and inwardly from the junction with the sole to conform with the slope of the hoof side walls;
(4) and said rear wall consisting of rearwardly inclined material extending from the junction with the sole to conform with the slope of the hoof rear wall below the bulbs and extending in height to a point proximate to and not in contact with the soft bulbs;
(5) the front wall of the horseshoe covering a substantial area of the front wall of the hoof and extending upward from the junction with the sole a distance of not less than one-fourth the distance from the toe of the coronary band short of contact with the coronary band;
(6) the upper edges of the sidewalls incline on approximately a crosswise plane from the point of juncture with the top of the shoe front wall to the point of juncture with the top of the shoe rear wall;
(7) at least one reinforcing integral protuberance on the outside portion of each sidewall of the shoe adapted to cooperate with a self-tapping screw passing at substantially a right angle there-through for detachably affixing the shoe to the hoof by penetration into the hoof wall a distance less than the thickness of the hoof wall;

(8) a flexible self-setting polyurethane foaming mix poured into the shoe at the time of installation on a horse's hoof thereby sealing the shoe around and to the hoof against the entry of debris and forming a mechanical coupling between the sole of the shoe and the irregular sole including the frog of the hoof, said foaming mix when set having mechanical properties similar to those of the frog to obtain optimum coupling.

* * * * *